United States Patent
Herbolzheimer

(10) Patent No.: US 8,346,457 B2
(45) Date of Patent: Jan. 1, 2013

(54) METHOD FOR CONTROLLING AN AUTOMATIC SHUTDOWN AND START-UP PROCESS OF A DRIVE UNIT IN A MOTOR VEHICLE

(75) Inventor: Robert Herbolzheimer, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/328,960

(22) Filed: Dec. 16, 2011

(65) Prior Publication Data

US 2012/0089317 A1    Apr. 12, 2012

Related U.S. Application Data

(63) Continuation of application No. PCT/EP2010/058739, filed on Jun. 21, 2010.

(30) Foreign Application Priority Data

Jun. 23, 2009   (DE) .................. 10 2009 029 990

(51) Int. Cl.
*F02D 45/00* (2006.01)
*B60H 1/00* (2006.01)
*F02D 17/00* (2006.01)
*G06F 17/00* (2006.01)

(52) U.S. Cl. ................................ 701/102

(58) Field of Classification Search .............. 701/102, 701/101, 112, 113; 123/179.3–179.5
See application file for complete search history.

(56) References Cited

U.S. PATENT DOCUMENTS

| 6,526,931 B1 | 3/2003 | Vilou |
| 6,763,903 B2 | 7/2004 | Morimoto et al. |
| 6,895,917 B2 | 5/2005 | Itoh et al. |
| 2012/0143477 A1* | 6/2012 | Ruona et al. .......... 701/103 |

FOREIGN PATENT DOCUMENTS

| DE | 100 30 290 A1 | 8/2001 |
| DE | 101 61 343 A1 | 7/2002 |
| DE | 10 2004 002 440 A1 | 9/2004 |
| DE | 10 2007 003 289 A1 | 7/2008 |
| EP | 1 564 403 A2 | 8/2005 |
| JP | 2004-84484 A | 3/2004 |
| JP | 2010234837 A * | 10/2010 |

OTHER PUBLICATIONS

German Search Report dated Oct. 5, 2009 including partial English-language translation (Nine (9) pages).
International Search Report dated Sep. 16, 2010 including English-language translation (Four (4) pages).

* cited by examiner

*Primary Examiner* — Hieu T Vo
(74) *Attorney, Agent, or Firm* — Crowell & Moring LLP

(57) ABSTRACT

A method controls an automatic shutdown and start-up process of a drive unit in a motor vehicle by way of a start and stop device, by which the drive unit is automatically shut down when the motor vehicle comes to a halt if predefined shutdown conditions are met, and by which a drive unit, which has been automatically shut down, is automatically started up if at least one start request is made. Before the initiation of an automatic shutdown process of the drive unit, a possible stop duration of the drive unit is predicted, taking into consideration the present operating variables of the vehicle, the state variables, and/or other parameters. Depending on the predicted stop duration, an automatic shutdown process is initiated when all other shutdown conditions are met.

8 Claims, 1 Drawing Sheet

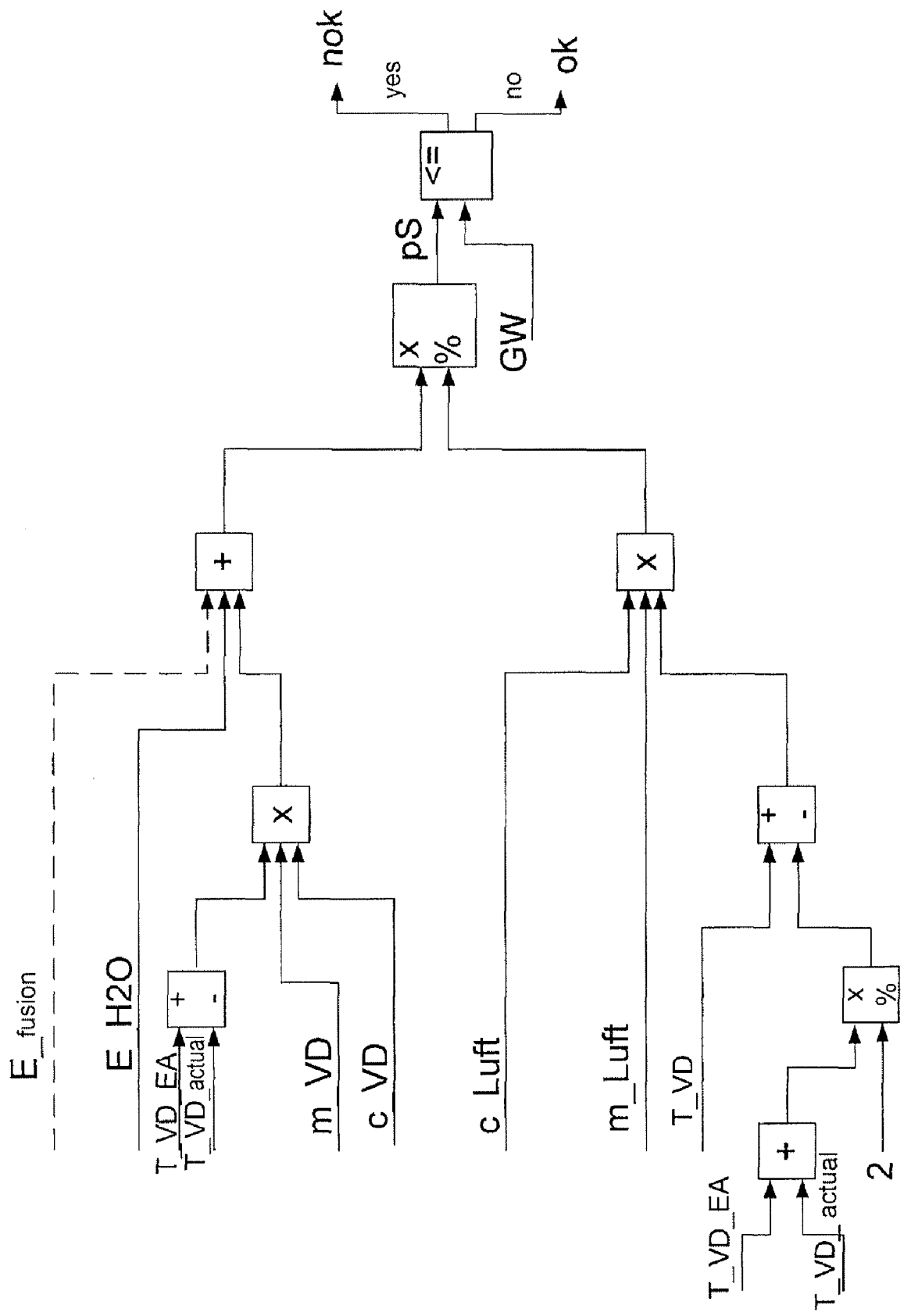

METHOD FOR CONTROLLING AN AUTOMATIC SHUTDOWN AND START-UP PROCESS OF A DRIVE UNIT IN A MOTOR VEHICLE

CROSS-REFERENCE TO RELATED APPLICATIONS

This application is a continuation of PCT International Application No. PCT/EP2010/058739, filed Jun. 21, 2010, which claims priority under 35 U.S.C. §119 from German Patent Application No. DE 10 2009 029 990.4, filed Jun. 23, 2009, the entire disclosures of which are herein expressly incorporated by reference.

BACKGROUND AND SUMMARY OF THE INVENTION

The invention relates to a method for controlling an automatic shutdown and start-up process of a drive unit in a motor vehicle.

In order to reduce fuel consumption and pollutant emissions, the current trend is to develop methods and systems (and to some extent they have also been already installed) that automatically shutdown the internal combustion engine of a motor vehicle under certain conditions and/or in the presence of predetermined shutdown conditions and automatically re-start the internal combustion engine in the presence of predetermined start-up conditions and/or start requests. Such methods and systems or, more specifically, such start and stop devices lend themselves well predominantly to city traffic, in order to reduce the consumption of fuel. This is because in city traffic the vehicle often comes to a standstill at traffic lights or owing to the traffic and because it is not necessary to run the internal combustion engine.

Hence, DE 101 61 343 A1 discloses an automatic stop and start-up control device for an internal combustion engine. In this case the control device executes corresponding measures for shutting down the internal combustion engine, when all of the shutdown conditions are met. For example, the speed of the vehicle has to be below a predetermined limit value. In the case of manual transmissions no gear may be engaged, and in the case of vehicles with automatic transmissions the gear shift position of the transmission must be in a neutral position.

In addition, DE 100 30 290 A1 also discloses a method and a system for automatically shutting down and starting up again an internal combustion engine. In this case an automatic shutdown process is inhibited, when the charge state of the battery of the vehicle is below a predetermined lockout threshold. As additional shutdown conditions, it is also checked whether the speed of the vehicle is below a predetermined limit value, whether the transmission is in the idling position, and whether the accelerator pedal is in the rest position.

Finally DE 10 2007 003 289 A1 discloses a method for controlling an automatic shutdown and start-up process of a drive unit in a motor vehicle that is equipped with an air conditioning system. In this case the drive unit, which has been automatically shut down, is automatically started, when a start request is made. The activation of a start request occurs, for example, as a function of an operating parameter of the air conditioning system, in particular as a function of the present evaporator temperature.

The trend in modern motor vehicles provided with an air conditioning system and a start and stop system is to predetermine, for example, as a function of the outside air temperature, an evaporator temperature threshold value, at which or above which a start request for initiating an automatic start process of a drive unit, which has been automatically shut down, occurs.

The evaporator temperature threshold value is supposed to prevent the evaporator that is warming up from dragging moisture and/or odor into the interior of the motor vehicle when the drive unit is shut down. In order to prevent extremely short stop periods of the drive unit, an additional evaporator temperature threshold, which is somewhat lower than the start threshold, was also introduced. This additional evaporator temperature threshold causes a shutdown inhibition, when at the time that the shutdown process of the drive unit is initiated, the current evaporator temperature already exceeds this additional threshold.

The drawback with such a method is that despite the undershooting of the additional threshold (for example, because of the blower fan output or a high internal temperature) only a very short stop period is achieved due to the different boundary conditions. In contrast, even if this additional threshold is exceeded, the stop period could be long enough under other boundary conditions. Moreover, with such an inflexible threshold other climate parameters, such as the state of charge of an accumulator evaporator that may be used, are not considered as the start requesters.

The object of the invention is to provide an improved method that is intended for controlling an automatic shutdown and start-up process of a drive unit in a motor vehicle by which a shutdown process is initiated only if a sufficient standstill period (until a system dependent start requester is reached) can be guaranteed.

This and other objects are achieved by a method for controlling an automatic shutdown and start-up process of a drive unit in a motor vehicle, which is ideally equipped with an air conditioning system, by way of a start and stop device, by which the drive unit is automatically shut down, when the motor vehicle comes to a halt, if predefined shutdown conditions are met, and by which a drive unit, which has been automatically shut down, is automatically started up, if at least one start request is made. In order to be able to ensure a sufficient standstill time until a system dependent start request occurs, the invention provides that before the initiation of an automatic shutdown process of the drive unit, a possible stop duration of the drive unit is predicted, taking into consideration the present operating variables of the vehicle, the state variables, and/or other parameters. Then, depending on the predicted stop duration, an automatic shutdown process is allowed or inhibited when all other shutdown conditions are met.

This novel method has the advantage that when all other shutdown conditions are met, an automatic shutdown process is initiated, when the predicted stop duration is at least not less than a predetermined stop duration limit value that may also be variable, if desired. If, however, the predicted stop duration is less than the optionally freely applicable stop duration limit, then, however, no automatic shutdown process is allowed.

This method can prevent the driver from becoming unsure due to frequent re-start-ups of the drive unit after a short standstill duration. This method also makes it possible to achieve a fixed minimum stop duration under almost all circumstances.

Ideally, the stop duration is predicted by use of a mathematical model, because virtually all physical processes that are relevant for the possible stop duration can be simulated by developing a model.

The advantage of this approach is that the stop duration up to the occurrence of a predetermined and defined start request is predicted. Since driver-sided start requesters are difficult to predict, the stop duration until the occurrence of a system dependent start request (for example, a start request because a predetermined evaporator temperature has been exceeded) is predicted.

If the motor vehicle having the start and stop device is equipped, for example, with an air conditioning system and if the method for controlling an automatic shutdown and start-up process of the drive unit is configured such that when the air conditioning system is switched on, a system dependent start request occurs as a function of overshooting a threshold value of the evaporator temperature of an air conditioning system evaporator, then the stop duration until the occurrence of an evaporator temperature dependent start request can be predicted before the automatic shutdown of the drive unit, wherein the evaporator temperature dependent start request is made when a predetermined evaporator temperature threshold value is reached or exceeded. This means that before the initiation of the shutdown process which is possible in principle, it is determined how long the drive unit could stay shut down, until the evaporator temperature increases so far that it will presumably reach or exceed the predetermined maximum evaporator temperature threshold value. If the determined expected stop duration is long enough, then the automatic shutdown process is allowed. If this duration is very short, then the automatic shutdown process is suppressed.

In order to be able to determine, or more specifically predict, the stop duration until the occurrence of the evaporator temperature dependent start request, a plurality of current operating variables of the vehicle, state variables and/or other parameters can be considered. In particular, the operating variables of the air conditioning system, the operating parameters of the air conditioning system, and/or at least one climate parameter characterizing the climate state of the interior of the vehicle and/or a climate parameter characterizing the climate state of the immediate vehicle environment should be considered. As a result, the physical modeling for predicting the standstill duration until the occurrence of the evaporator temperature dependent start request, which immediately brings about an automatic start of the drive unit, can be based on at least one or more of the following input variables or, more specifically, characteristics: (1) activity of a climate function, (2) current evaporator temperature, (3) evaporator temperature threshold value, at which a start request occurs, (4) current outside temperature, (5) inside temperature, (6) current blower fan output of a front blower fan, (7) current blower fan output of a rear blower fan (if present), (8) the melting point of any refrigerant accumulator medium that is used, (9) the temperature dependent enthalpy of fusion of any refrigerant accumulator medium that is used, (10) the enthalpy of the evaporation of the water accumulated in the air conditioning system evaporator, (11) rate of the enthalpy increase when the air conditioning system evaporator is under load (that is, the phase transformation of any accumulator medium that is used and/or the accumulation of water in the evaporator), (12) thermal capacity of the air conditioning system evaporator, (13) mass of the evaporator, (14) parameters for estimating the air inlet temperatures at the air conditioning system evaporator, (15) conversion curve for converting the expression of the percent amount of air into an air mass flow expression, and/or (16) the specific thermal capacity of the air.

The inventive method and its advantageous embodiments can be carried out by way of an implemented algorithm or a corresponding arrangement of modules in a control unit that is provided for this purpose, in particular in an engine control unit or an air conditioning system control unit.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE shows a mathematical model for calculating the predicted stop duration pS until the occurrence of an evaporator temperature dependent start request according to an exemplary embodiment of the invention.

DETAILED DESCRIPTION OF THE DRAWING

Referring to the figure, the predicted stop duration pS is calculated until the occurrence of an evaporator temperature dependent start request, where the evaporator temperature dependent start request would be made when a predetermined maximum evaporator temperature threshold value T_VD_EA is reached or exceeded. The prediction is performed before the initiation of any possible shutdown process of the drive unit, in order to be able to check once again at the end by way of the results whether a shutdown of the drive unit may be allowed or has to be suppressed.

The stop duration pS is predicted as a function of a plurality of predetermined operating variables of the air conditioning system, the operating parameters of the air conditioning system, and/or the climate parameters characterizing the climate state of the interior of the vehicle. This mathematical model can be stored, for example, in an air conditioning system control unit, and the results of this evaluation can be sent to a control unit—for example, an engine control unit—that is responsible for controlling an automatic shutdown and start-up process of the drive unit.

The mathematical model maps the following physical formulas:

$$\frac{c\_VD * m\_VD * (T\_VD\_EA - T\_VD\_actual) + E\_fusion + E\_H2O}{\{c\_air * \dot{m}\_air * (T\_VD - [T\_VD\_EA + T\_VD\_actual/2])\}}$$

where
 c_VD is the specific thermal capacity of the evaporator,
 M_VD is the mass of the evaporator,
 T_VD_EA is the evaporator temperature threshold, at which a start request for switching on the drive unit occurs,
 T_VD_actual is the current evaporator temperature,
 E_fusion is the enthalpy of fusion of the loaded evaporator (otherwise zero),
 E_H2O is the enthalpy of the evaporation of water,
 c_air is the specific thermal capacity of the air,
 $\dot{m}$_air is the air mass flow through the evaporator, and
 T_VD is the current air temperature at the evaporator inlet, which can also be calculated from a model.

After the expected stop duration pS is found, the determined expected stop duration pS is then compared with a predetermined stop duration limit value GW. If the expected stop duration pS is less than (or equal to) the predetermined stop duration limit value GW, then a signal "nok" is sent, and the automatic shutdown process of the drive unit is suppressed. If, however, the expected stop duration pS is greater than the predetermined stop duration limit value GW, then a signal "ok" is sent, and the automatic shutdown process of the drive unit is allowed.

At this point the advantage of the inventive method for controlling an automatic shutdown and start-up process of a drive unit prevents the occupant from becoming unsure, for example as to whether the vehicle is operating properly, due to all too frequent re-startups of the drive unit during an automatic stop. Rather, a stop duration, which has been predicted beforehand, is always reached under almost all circumstances.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an automatic shutdown and start-up process of a drive unit in a motor vehicle equipped with a start and stop device by which the drive unit automatically shuts down when the motor vehicle comes to a halt if predefined shutdown conditions are met, and by which a automatically shutdown drive unit is automatically started up if at least one start request is made, the method comprising the acts of:
    receiving information on at least one of current operating variables of the vehicle, state variables, and other parameters;
    prior to initiating an automatic shutdown of the drive unit via the start and stop device, predicting a possible stop duration of the drive unit based on the received information; and
    when the predefined shutdown conditions are met, initiating the automatic shutdown of the drive unit dependent on the predicted possible stop duration.

2. The method according to claim 1, wherein the automatic shutdown is initiated when the predicted possible stop duration is at least not less than a predetermined stop duration limit.

3. The method according to claim 2, wherein the motor vehicle is further equipped with an air conditioning system, wherein when the air conditioning system is switched on, an evaporator temperature dependent start request occurs as a function of overshooting a threshold value of an evaporator temperature of an air conditioning system evaporator, the method further comprising the acts of:
    predicting a stop duration until the occurrence of the evaporator temperature dependent start request, wherein the evaporator temperature dependent start request is made when a predetermined maximum evaporator temperature threshold value is reached or exceeded.

4. The method according to claim 1, wherein the predicted possible stop duration is a stop duration until an occurrence of a predetermined start request.

5. The method according to claim 4, wherein the predetermined start request is a system dependent start request.

6. The method according to claim 1, wherein the motor vehicle is further equipped with an air conditioning system, wherein when the air conditioning system is switched on, an evaporator temperature dependent start request occurs as a function of overshooting a threshold value of an evaporator temperature of an air conditioning system evaporator, the method further comprising the acts of:
    predicting a stop duration until the occurrence of the evaporator temperature dependent start request, wherein the evaporator temperature dependent start request is made when a predetermined maximum evaporator temperature threshold value is reached or exceeded.

7. The method according to claim 6, wherein during the predicting of the possible stop duration until the occurrence of the evaporator temperature dependent start request, at least one of the following operating information of the air conditioning system is taken into account:
    (1) activity of a climate function,
    (2) current evaporator temperature,
    (3) evaporator temperature threshold value, at which a start request occurs,
    (4) outside temperature,
    (5) inside temperature,
    (6) current blower fan output of a front blower fan,
    (7) current blower fan output of a rear blower fan,
    (8) melting point of any refrigerant accumulator medium that is used,
    (9) temperature dependent enthalpy of fusion of any refrigerant accumulator medium that is used,
    (10) enthalpy of evaporation of the water accumulated in the air conditioning system evaporator,
    (11) rate of the enthalpy increase when the air conditioning system evaporator is under load,
    (12) thermal capacity of the air conditioning system evaporator,
    (13) mass of the evaporator,
    (14) parameters for estimating the air inlet temperatures at the air conditioning system evaporator,
    (15) conversion curve for converting the expression of the percent amount of air into an air mass flow expression,
    (16) specific thermal capacity of the air.

8. The method according to claim 1, wherein during the predicting of the possible stop duration, the received information includes at least one of operating information on the air conditioning system and climate parameters characterizing a climate state of at least one of an interior of the vehicle and an immediate vehicle environment.

* * * * *